Jan. 19, 1954   V. J. SIGODA   2,666,486
LEDGER BLADE FOR PINKING MECHANISMS
Original Filed Nov. 24, 1945

INVENTOR.
Victor J. Sigoda
BY *Strauch & Hoffman*
attorneys

Patented Jan. 19, 1954

2,666,486

UNITED STATES PATENT OFFICE 2,666,486

LEDGER BLADE FOR PINKING MECHANISMS

Victor J. Sigoda, Great Neck, N. Y., assignor to Man-Sew Corporation, New York, N. Y., a corporation of New York Original application November 24, 1945, Serial No. 630,635, now Patent No. 2,540,355, dated February 6, 1951. Divided and this application October 28, 1946, Serial No. 706,229

13 Claims. (Cl. 164—70)

This invention relates to ledger blades and, in a preferred embodiment thereof, is designed for use in connection with pinking mechanism of the type disclosed in my pending application, Serial No. 630,635, filed November 24, 1945, now Patent No. 2,540,355, issued February 6, 1951, of which the subject matter of the present application is a division.

It is a prominent object of my invention to provide a ledger blade having shearing edges to cooperate with the cutting edges of a relatively movable cutting member, together with means on said ledger blade substantially coextensive with each shearing edge thereof to cooperate with the cutting member and tensionally stress the fabric material in the cutting or pinking operation.

Another object is to provide a simple and inexpensive ledger blade construction, in which the said tensioning means comprises lands or ribs on the top surface of the ledger blade having the shearing edges formed thereon and spaced above the plane of said surface.

A further object resides in the provision of a ledger blade having an integrally formed part thereof adapted to contact with the movable cutter to maintain an accurately assembled relation between the cutter and ledger blade and insure proper coaction of the cutter with the shearing edges of the blade, to prevent excessive frictional wear of the latter and obtain a clean sharp pinking cut.

It is an additional object, in one specific embodiment of the invention, to provide a ledger blade for use in combination with a toothed cutter mounted for movement about a fixed axis, said blade being formed with adjacent recesses through which the cutter teeth move, to cooperate with the shearing edges of one recess, and a part between said recesses for coaxial bearing contact with the cutter.

In general, it is the aim and purpose of the present invention to provide a ledger blade for pinking devices having one or more of the above noted novel features and which will efficiently function to obtain maximum output of a high quality product with minimum waste and operating expense.

With the above and other subordinate objects in view, the invention comprises the improved ledger blade and the construction and relative arrangement of its several parts, as will hereinafter be more fully described, illustrated in the accompanying drawings, and subsequently incorporated in the subjoined claims.

In the drawings, wherein I have disclosed one simple and practical embodiment of the invention, and in which similar reference characters designate corresponding parts throughout the several views.

Figure 1:
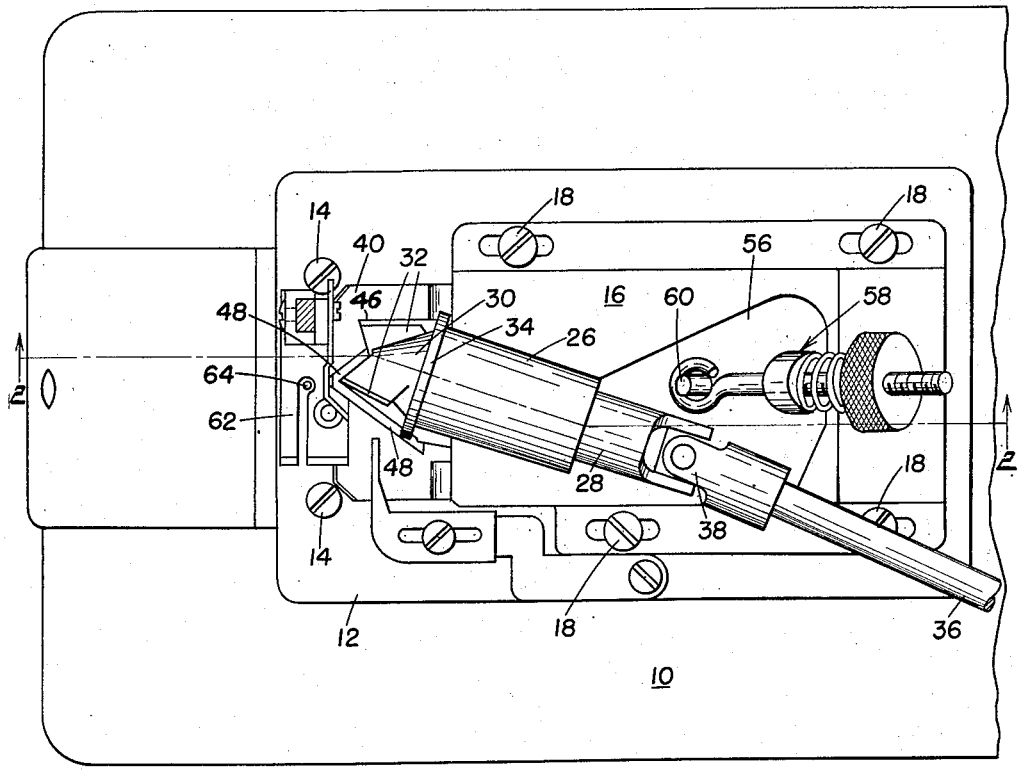
Figure 1 is a top plan view, illustrating one practical embodiment of the invention and showing my novel ledger blade in cooperatively assembled relation with the movable pinking cutter.
Figure 2:
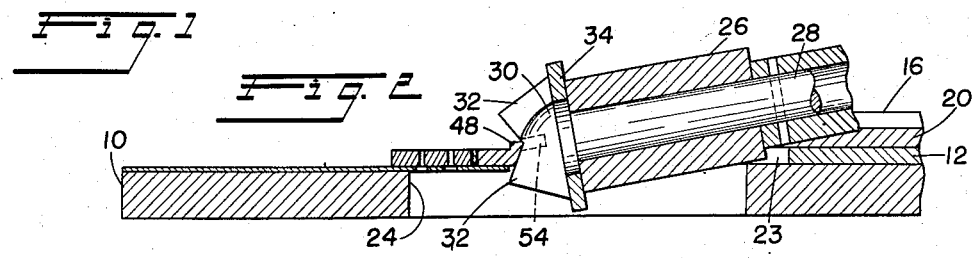
Figure 2 is a vertical sectional view taken substantially on the line 2—2 of Figure 1.
Figure 3:
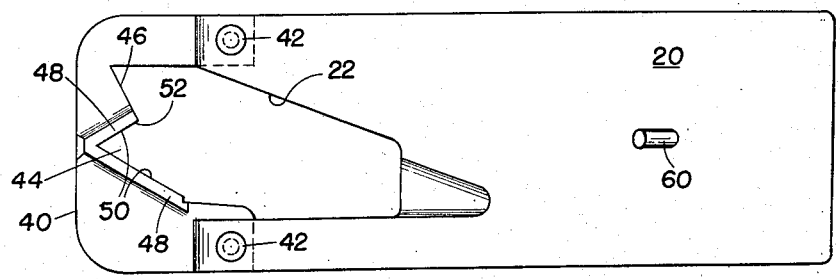
Figure 3 is an enlarged plan view of the ledger blade.

Referring in further detail to the drawings, for purposes of illustration, I have shown a part of the bed 10 of a sewing machine upon which the pinking device or attachment is mounted at the inner side of the stitch-forming mechanism of the machine. This attachment comprises the base plate 12, secured to the machine bed 10 by means of suitable screws 14. Upon this base plate, an elongated guide member 16 is adjustably mounted by means of the screws 18. Between this guide member and the base plate 12, the body portion 20 of a ledger blade is slidably confined for movement in a direction transverse to the feed path of the material to the stitch-forming mechanism of the machine. The forward end of the body section of the ledger blade 20 is provided with an opening 22 overlying registering openings 23 and 24 in the base plate 12 and machine bed 10, respectively.

Upon the forward end of the guide member 16, a transversely and vertically inclined bearing 26 is integrally formed and extends forwardly and downwardly through the openings 22 and 24 in the ledger blade section 20 and the machine bed respectively. In this bearing, the shaft 28 having a cutter head 30 integrally formed with or rigidly secured to the forward end thereof, is rotatably mounted. This cutter head is provided with one or more cutting teeth 32 of general triangular form or shape, and between said cutter head and the forward end of bearing 26 a large diameter thrust washer and deflector 34 is preferably interposed. Any suitable means, driven from the main shaft of the machine or other source of power, may be provided for driving the cutter shaft 28, and, as herein shown, includes the drive shaft 36 connected to the rear end of shaft 28 by means of a suitable universal joint 38.

The ledger blade also includes a nose piece 40 which is integrally formed with or detachably secured to the forward end of the body section 20 of said blade by means of suitable screws or rivets, indicated at 42, and disposed in the forward end of opening 23 in base plate 12. This nose piece is formed with directly adjoining, substantially V-shaped notches or recesses 44 and 46 respectively, the open ends of which are in confronting relation to the forward open end of the opening 22 in the ledger blade body section 20. The notch 44 is bounded by a relatively thick portion of the nose section 40, which in the present instance is shown in the form of a narrow upstanding rib or land 48, substantially coextensive with each side edge of the notch. These lands may be integrally joined at the apex of the notch as shown to form a continuous land having its upper surface disposed in a common plane above and parallel with the top surface of the nose piece 40, and having a sharp shearing edge 50 extending along each side of the notch.

The juncture of the adjacent side edges of the adjoining notches 44 and 46, at the inner end of one of the lands 48, forms a reinforced bearing apex 52 adapted for axial thrust contact with the end of a hardened steel plug 54 fitted in an axial bore in the cutter head 30.

Rearwardly of the bearing 26, guide member 16 is provided with an opening 56 through which an adjustable tension regulating device 58 mounted upon said guide member is connected to a pin or stud 60 fixed in the ledger blade body section 20. It will thus be understood that the point or apex 52 of the ledger blade nose piece 40 is yieldingly urged into constant bearing contact with the cutter head 30 at the axis thereof, about which the cutter teeth 32 move through the notches or recesses 44 and 46. Thus a normal cooperative relationship between the cutting edges of the teeth 32 and the shearing edges of the lands 48 on the ledger blade is established and maintained so that overriding of said shearing edges by the cutter teeth and rapid dulling thereof will be obviated. This tensioning device, more fully shown in application Serial No. 630,635, is not claimed herein so that further detailed description is not required. However, I preferably employ the improved form of tensioning device described and claimed in my application Serial No. 687,455, filed July 31, 1946, now Patent No. 2,541,110, issued February 13, 1951.

It will be noted that the lands 48 and the shearing edges 50 of the ledger blade are located closely adjacent to the presser foot 62 and the stitch forming needle 64 of the sewing machine. Thus, when the presser foot is depressed upon the fabric, the lands 48 will act in cooperation with cutter teeth 32 to more or less uniformly stress the fabric material over the shearing edges 50 as the two cutting edges of each cutter tooth successively coact with the two shearing edges 50 of the ledger blade to form a pinking cut in the edge of the material. This feature has been found to be of particular practical importance in the pinking of multiple plies or layers of silk, satin, or other synthetic fabric materials having exceedingly smooth or highly glossed surfaces, and insures accurate registration and uniformity in the size of the pinking cut made in the fabric plies.

In the present instance, I have shown the fixed axis of the movable cutting member disposed at a vertical angle of substantially 10 degrees to the horizontal. It will however be understood that insofar as the subject matter of the present application is concerned, this movable or rotary cutter may be mounted in various other ways and provided either as a part of an accessory or attachment or mounted directly upon the machine bed. Similarly, the ledger blade may be of various other structural forms and also directly mounted upon the bed of the sewing machine.

From the foregoing description and the accompanying drawings, it will be appreciated that I have provided a ledger blade construction which is simple and inexpensive and will efficiently cooperate with the movable cutting member to pink or cut various kinds of fabric materials with a high degree of accuracy and minimum waste. Also maintenance cost is reduced to a minimum since, by forming the shearing edges of the ledger blade on the ribs or lands, said edges may be easily and quickly sharpened with a minimum of manual labor, as it is necessary to dress only the top edges of the lands, instead of the entire surface of the ledger blade.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A ledger blade for fabric pinking devices having shearing edges defining a pinking notch and means projecting above the top surface of said blade for uniformly tensioning the fabric in contact with said shearing edges.

2. The ledger blade defined in claim 1, wherein said shearing edges and the fabric contacting surface of said tensioning means are disposed in a common plane above the plane of said top surface of said blade.

3. The ledger blade defined in claim 1, wherein said tensioning means comprises an upstanding rib or land substantially parallel to and coextensive with each of said shearing edges.

4. A ledger blade for fabric pinking devices having a pinking notch bounded by an adjacent part of the blade structure having a fabric contacting surface disposed above the plane of the top surface of the blade and formed with shearing edges substantially coextensive with the respective edges of the pinking notch.

5. A ledger blade for fabric pinking devices having a pinking notch and a continuous upstanding rib or land on the top surface of the blade bounding said notch and provided with shearing edges substantially coextensive with the respective edges of the pinking notch.

6. A ledger blade for fabric pinking devices having a pinking notch of V-shaped form and upstanding ribs or lands formed on said blade and each provided at its top surface with a shearing edge extending along one side edge of the pinking notch.

7. A ledger blade for fabric pinking devices having adjoining notches, one of said notches being provided with shearing edges, said shearing edges projecting above the top surface of said blade for uniformly tensioning the fabric in contact with said shearing edges.

8. The ledger blade defined in claim 7 in which said shearing edges are part of an upstanding rib or land substantially parallel to and coextensive with each of said shearing edges.

9. A ledger blade for fabric pinking devices provided with adjoining notches, one of said notches having a continuous upstanding rib or land raised above the top surface of the blade bounding said notch, said land being provided with shearing edges substantially coextensive with the respective edges of the pinking notch.

10. The ledger blade defined in claim 9 in which one end of said raised land forms a bearing apex for a mating cutter rotatable about said apex.

11. The ledger blade defined in claim 9 in which the end of the raised land at the junction of the adjoining notches forms a bearing apex for a mating cutter rotatable about said apex.

12. The ledger blade defined in claim 9 in which the end of the raised land at the junction of the adjoining notches is provided with a pyramidally shaped bearing apex for a mating cutter rotatable about said apex.

13. The ledger blade defined in claim 9 in which the end of the raised land at the junction of the adjoining notches is provided with a pyramidally shaped bearing apex for a mating cutter rotatable about said apex, one face of which lies in the plane of said land above the surface of the blade and whose other intersecting faces are angularly offset with respect to said plane.

VICTOR J. SIGODA.

References Cited in the file of this patent

UNITED STATES PATENTS

| Number | Name | Date |
|---|---|---|
| 1,886,422 | Popper | Nov. 8, 1932 |
| 1,909,346 | Gruman | May 16, 1933 |
| 1,956,677 | Gruman | May 1, 1934 |
| 1,978,291 | Bowman | Oct. 23, 1934 |
| 2,049,351 | Brussell | July 28, 1936 |
| 2,095,570 | Moulton | Oct. 12, 1937 |
| 2,239,743 | Sigoda | Apr. 29, 1941 |
| 2,297,372 | Stevenson | Sept. 29, 1942 |
| 2,540,355 | Sigoda | Feb. 6, 1951 |